United States Patent Office 3,692,708
Patented Sept. 19, 1972

3,692,708
MICROPOROUS POLYURETHANE FILMS AND
THEIR PRODUCTION
Ernst Meisert, Hellmut Striegler, Hans-Joachim Koch, and Wolfgang Klebert, Leverkusen, Germany, assignors to Farbenfabriken Bayer Aktiengesellschaft, Leverkusen, Germany
No Drawing. Filed May 14, 1970, Ser. No. 37,298
Claims priority, application Germany, May 21, 1969,
P 19 25 997.3
Int. Cl. B29d 7/14, 27/00; C08g 22/14
U.S. Cl. 260—2.5 AY                              8 Claims

ABSTRACT OF THE DISCLOSURE

Porous sheet structures and a process for producing them from thermoplastic elastomers are provided wherein about 100 parts by weight of a thermoplastic elastomer are processed in the presence of from about 60 to about 150 parts by weight of sodium-hydrogen carbonate and from about 3 to about 15 parts by weight of an aliphatic organic carboxylic acid having a molecular weight of from about 150 to about 5000 and an acid number of at least 2.5 on calenders, particularly heated calenders, and the films obtained are freed from salt by a subsequent rinsing process. The structures thus obtained are excellent leather substitutes.

---

It is generally known that porous synthetic plastic films are used as substitutes for leather for the production of products. Such porous synthetic plastic films can be prepared from solutions of synthetic plastics, e.g. from polyurethanes, by the introduction of a non-solvent to coagulate the synthetic plastic. Such processes, for example as described in German Pat. 1,270,276 and Belgian Pat. 718,402, yield microporous films which, in combination with textile supporting materials, are used in the shoe industry.

Another method for producing porous sheet structures consists in combining reactive components which form a porous structure upon reaction as described, for example, in Belgian Pats. 705,612, 715,003, and 719,272.

Thermoplastic synthetic plastic materials which exist in a finely divided form can likewise be transformed into porous sheet structures using a heat treatment whereby the separate particles are fused as described, for example, in Belgian Pat. 714,304.

Another process for producing porous plastic films inheres in the selective vaporization of a solvent mixture as described in Belgian Pat. 722,775, for example. In this process, one of the solvents functions as a non-solvent which causes the mass to coagulate after the vaporization of the other solvent. As a consequence a porous film is provided after the coagulated mass is dried.

Porous synthetic plastic films can also be obtained from thermoplastic starting materials by adding nitrogen or other gas-releasing blowing agents to the thermoplasts. Unfortunately, however, mainly synthetic plastic films having closed cells are obtained in this way.

Attempts have also been made to transform thermoplastic synthetic plastics into porous foils by adding readily soluble salts thereto. The salt-containing chemical materials are processed into films and the salt is then extracted by treatment with water.

The processes referred to above are more or less complicated, costly and often yield only closed pores. In the case of the process in which a salt is used and then extracted, difficulties are encountered since the operations are hard to carry out and the pores which are obtained are very large and frequently irregularly distributed over the entire surface.

It is therefore an object of this invention to provide porous plastic films and a method for the production thereof which are devoid of the foregoing disadvantages.

Another object of this invention is to provide a method for preparing porous plastic films which is easily carried out, inexpensive and which yields products having a uniform, microfine, open-celled structure.

Still another object of this invention is to provide porous synthetic plastic films which are eminently suitable as substitutes for leather.

The foregoing objects and others which will become apparent from the following description are accomplished in accordance with this invention, generally speaking, by providing porous plastic sheet structures prepared by mixing about 100 parts by weight of a thermoplastic polyurethane elastomer with from about 60 to about 150 parts by weight of sodium hydrogen carbonate and from about three to about fifteen parts by weight of an aliphatic organic carboxylic acid having a molecular weight of from about 150 to about 5000 and an acid number of at least 2.5, calendering the mixture and rinsing the film thus obtained to free it from the salt. Preferably, the calender upon which the mixture is processed is heated.

It has now been found that porous synthetic plastic films, preferably thermoplastic polyurethane films, can be produced in a very simple manner by the process of this invention if granules of the synthetic plastic are mixed with sodium bicarbonate and solid carboxylic acids, particularly fatty acids, and the mixture is processed into films or coatings on calenders which are preferably heated. Gas is thus released during the thermoplastic processing and the fine pores which form as a result are then opened by salt residues which are finally removed by a subsequent treatment of the film with water. As a consequence, the previously described disadvantage of the salt-extraction process is obviated and a micro-fine uniform porosity is obtained. The process of this invention provides the additional advantages that it is no longer necessary to use extremely finely ground salts such as were required in conventional prior art salt-extraction processes, and that there is a micro-fine distribution of the salt because of the thermal decomposition of the sodium bicarbonate during the calendering process.

In general, all polyurethane thermoplasts, and particularly those suitable for use as coatings on textiles, can be used in the practice of this invention. Preferred thermoplasts are those, as described in U.S. Pat. Nos. 2,871,218 and 2,899,411. In addition porous fillers, e.g. silica gel, alumina dye-stuff pigments, lubricants and the like can naturally be introduced simultaneously with the practice of this invention.

According to a preferred embodiment of the invention the thermoplastic polyurethane elastomer is a blend consisting of the polyurethane elastomer and polyvinyl chloride, polyoxy methylene or an acrylonitrile-butadiene-styrene-copolymer, said blend containing at least 50% by weight of the polyurethane elastomer. The polyvinyl chloride, polyoxy methylene or the acrylonitrile-butadiene-styrene-copolymer are those commercially available.

Any suitable carboxylic acids may be used in the process of this invention, particularly fatty acids having from 1 to 18 carbon atoms, including, for example, stearic acid, palmitic acid, myristic acid, oleic acid and so on. Compounds comprising carboxyl groups and having a molecular weight of up to 5000 and an acid number greater than 2.5, such as oxidized polyethylene waxes, montanic acid waxes, partially saponified ester waxes and the like, can likewise be used. Besides monocarboxylic acids also di- and tri- or even higher functional carboxylic acids can be employed, however, monocarboxylic acids are preferred. The preferred carboxylic acids used in the process of the invention are those with acid numbers between 100 and 175.

In the practice of this invention, a polyurethane elastomer suitable for processing on a calender is uniformly mixed with from about 60 to about 150 parts by weight of sodium bicarbonate and from about 3 to about 15 parts by weight of a carboxylic acid, preferably a fatty acid such as stearic acid, based on 100 parts by weight of granulated material, and applied to a heated calender such as, for example, the heated calender of the heated lining machine type manufactured by Zimmer-Plastik, Offenbach. With cylinder temperatures between about 110° and 220° C.; the mass is homogenized and blown as a foam by the $CO_2$ which forms. The porous film transferred from the lining cylinder is applied to a support, for example a textile fabric, bonded unwoven fiber structures, leather, paper or removable films. After subsequent smoothing or embossing, the surface of the film can be made up. The coated material or the material detached from the removable film is subjected to an intensive washing process after being cooled and by this means the finished product is obtained.

The porous sheet structures produced by the process of this invention are valuable leather substitutes and can be used in the manufacture of shoes and other apparel, luggage and so on in place of leather.

The invention is further illustrated but is not intended to be limited by the following examples in which all parts and percentages are by weight unless otherwise specified.

EXAMPLE 1

About 100 parts of a polyester of adipic acid, hexane diol and neopentyl glycol having a molecular weight of about 2000 are mixed with about 8 parts of butane-1,4-diol and, after adding about 2 parts of 2,2′,6,6′-tetraisopropyl diphenyl carbodiimide, reacted with the theoretically calculated equivalent quantity of hexamethylene diisocyanate at about 140° C. The elastomer obtained is granulated on a cutting mill to give irregular granules with an edge length of 2 to 3 mm.

(a) Using a Zimmer laboratory lining machine KM 320, a film is calendered at a temperature of from about 140°/160° C. from the granulated material thus obtained. The foil obtained is transparent and does not show any pore structure.

(b) After adding about 1% of azodicarbonamide as a blowing agent, the hot-calendering process is again carried out with an identical polyurethane. An only slightly cloudy, colored film was obtained which showed practically no pores.

(c) About 100 parts of the granules are mixed with about 66 parts of sodium bicarbonate and about 4 parts of stearic acid and calendered onto a siliconized removable film as described above. The material stripped off of the removable film is then rinsed and shows a porous structure.

In a similar manner, about 100 parts of the granules are mixed with about 100 parts of sodium bicarbonate and about 8 parts of palmitic acid and then processed. A microporous film which has a very fine cell structure and which is very capable of breathing is obtained; this film is eminently suitable for the production of leather substitutes.

In the same manner, about 100 parts of the granules are mixed with about 120 parts of sodium hydrogen carbonate and about 7 parts of a polyethylene having a molecular weight of about 2500 and acid number of about 3.4. The mixture is calendered and then rinsed. A lining film having good breathing properties and very uniform pores is obtained.

The films obtained under 1(c) are laminated in the usual manner by reverse lining on bonded unwoven fibrous structures and a leather-like "actively breathing" product is obtained.

EXAMPLE 2

About 100 parts of a polyester of adipic acid and butane-1,4-diol, molecular weight 2000, are mixed with about 12 parts of butane-1,4-diol and reacted at about 135° C. with the calculated equivalent quantity of 4,4′-diphenylmethane diisocyanate. The mass is granulated after cooling and processed as in Examples 1(a) to 1(c) after being applied as a lining to a cotton fabric. On completion of the lining operation, the products obtained are washed in water at about 45° C., dried and then examined. The coatings obtained as described in 1(a) and 1(b) did not provide porous, air-pervious leather substitutes while the products produced as described in 1(c) showed excellent air permeability.

EXAMPLE 3

The procedure of Example 2 is used, but the calendered film is transferred to a porous polyurethane elastomer (peeled "Zell-Vulkollan") film having a thickness of 1 mm. The highly elastic, flexible structures thus obtained exhibited only good air-permeability and breathing activity when processed as described in 1(c).

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the production of porous plastic sheet structures which comprises mixing about 100 parts by weight of granules of a thermoplastic polyurethane elastomer with from about 60 to about 150 parts by weight of sodium-hydrogen carbonate and about 3 to about 15 parts by weight of an aliphatic organic carboxylic acid having a molecular weight of from about 150 to about 5,000 and an acid number of at least 2.5, calendering the mixture at between about 110° and 220° C. resulting in reaction between the sodium-hydrogen carbonate and aliphatic organic carboxylic acid to obtain a film having fine pores and rinsing the film thus produced to free it from the residual salt which forms as a result of the aforesaid reaction.

2. The process of claim 1, wherein the thermoplastic elastomer is a blend of a polyurethane elastomer with polyvinyl chloride, polyoxy methylene or an acrylonitrile-butadiene-styrene-copolymer, said blend containing at least about 50% by weight of the polyurethane elastomer.

3. The process of claim 1 wherein the calender is heated to a temperature of from about 110° to about 220° C.

4. The process of claim 1 wherein the organic carboxylic acid is stearic acid.

5. The process of claim 1 wherein the organic carboxylic acid is palmitic acid.

6. The product of the process of claim 1.

7. The process of claim 1 in which the carboxylic acid has an acid number between 100 and 175.

8. The process of claim 1 in which the carboxylic acid is a monocarboxylic acid.

References Cited

UNITED STATES PATENTS

| | | | |
|---|---|---|---|
| 2,871,218 | 1/1959 | Schollenberger | 260—858 |
| 2,899,411 | 8/1959 | Schollenberger | 260—77.5 AP |
| 2,466,826 | 4/1949 | Romaine | 260—2.5 M UX |
| 3,214,290 | 10/1965 | Larner et al. | 260—2.5 A XX |
| 3,100,721 | 8/1963 | Holden | 264—41 UX |
| 3,344,092 | 9/1967 | Pavuk | 264—DIG. 5 |

FOREIGN PATENTS

| | | | |
|---|---|---|---|
| 163,948 | 7/1955 | Australia | 260—2.5 M |

PHILIP E. ANDERSON, Primary Examiner

U.S. Cl. X.R.

161—159, 164, 190; 264—49, 175, DIG. 5, DIG. 62